United States Patent
Nilsson et al.

(10) Patent No.: US 10,984,218 B2
(45) Date of Patent: Apr. 20, 2021

(54) POST VERIFICATION FINGERPRINT IMAGE CAPTURE

(71) Applicant: FINGERPRINT CARDS AB, Gothenburg (SE)

(72) Inventors: René Nilsson, Eslöv (SE); Eric Setterberg, Västra Frölunda (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 16/609,650

(22) PCT Filed: Apr. 25, 2018

(86) PCT No.: PCT/SE2018/050422
§ 371 (c)(1),
(2) Date: Oct. 30, 2019

(87) PCT Pub. No.: WO2018/208204
PCT Pub. Date: Nov. 15, 2018

(65) Prior Publication Data
US 2020/0065554 A1    Feb. 27, 2020

(30) Foreign Application Priority Data
May 11, 2017   (SE) .................................. 1750882-7

(51) Int. Cl.
*G06K 9/00*      (2006.01)
*G06F 21/32*     (2013.01)
*G06F 21/45*     (2013.01)
*G06K 9/03*      (2006.01)

(52) U.S. Cl.
CPC .......... *G06K 9/00087* (2013.01); *G06F 21/32* (2013.01); *G06F 21/45* (2013.01); *G06K 9/00926* (2013.01); *G06K 9/036* (2013.01)

(58) Field of Classification Search
CPC ........... G06K 9/00087; G06K 9/00926; G06K 9/036; G06F 21/32; G06F 21/45
See application file for complete search history.

(56) References Cited

U.S. PATENT DOCUMENTS

2003/0156744 A1\* 8/2003 Hashimoto ........ G06K 9/00013
382/124
2005/0129290 A1\* 6/2005 Lo ........................ G06K 9/036
382/124
(Continued)

FOREIGN PATENT DOCUMENTS

CN    101499130 A    8/2009
CN    103780736 A    5/2014
(Continued)

OTHER PUBLICATIONS

PCT International Search Report and Written Opinion dated Sep. 3, 2018 for International Application No. PCT/SE2018/050422, 10 pages.

*Primary Examiner* — Stephen G Sherman
(74) *Attorney, Agent, or Firm* — RMCK Law Group, PLC (57) ABSTRACT

The invention relates to a method of a fingerprint sensing system arranged in an electronic device of capturing fingerprint data of a user contacting a fingerprint sensor of the fingerprint sensing system, and a fingerprint sensing system performing the method.

19 Claims, 9 Drawing Sheets

(56) References Cited

U.S. PATENT DOCUMENTS

| | | | |
|---|---|---|---|
| 2011/0007951 A1* | 1/2011 | Mil'shtein | G06K 9/00033 |
| | | | 382/124 |
| 2014/0003679 A1 | 1/2014 | Han et al. | |
| 2015/0347816 A1 | 12/2015 | Boshra | |
| 2015/0349959 A1 | 12/2015 | Marciniak | |
| 2015/0350202 A1 | 12/2015 | Wei | |
| 2016/0180146 A1 | 6/2016 | Setterberg et al. | |
| 2017/0330020 A1* | 11/2017 | Tuneld | G06K 9/00087 |
| 2018/0373361 A1* | 12/2018 | Her | G06F 3/042 |

FOREIGN PATENT DOCUMENTS

| | | |
|---|---|---|
| CN | 105303176 A | 2/2016 |
| CN | 105981045 A | 9/2016 |
| CN | 106022290 a | 10/2016 |

\* cited by examiner

POST VERIFICATION FINGERPRINT IMAGE CAPTURE

CROSS-REFERENCE TO RELATED APPLICATIONS

This application is a 371 U.S. National Stage of International Application No. PCT/SE2018/050422, filed Apr. 25, 2018, which claims priority to Swedish Patent Application No. 1750582-7, filed May 11, 2017. The disclosures of each of the above applications are incorporated herein by reference in their entirety.

TECHNICAL FIELD

The invention relates to a method of a fingerprint sensing system arranged in an electronic device of capturing fingerprint data of a user contacting a fingerprint sensor of the fingerprint sensing system, and a fingerprint sensing system performing the method.

BACKGROUND

Electronic devices such as smart phones, laptops, remote controls, tablets, smart cards, etc., may use fingerprint recognition e.g. to allow a user to access the device, to authorize transactions carried out using the electronic device, or to authorize the user for accessing a service via the electronic device.

Hence, the electronic device, being for example a smart phone, is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

A problem in the art is that when capturing a fingerprint with the fingerprint sensor resulting in the electronic device performing an appropriate action based on the captured fingerprint, it is desirable that the time period from the capturing of the fingerprint to the action being performed is as short as possible, while at the same time ensuring capturing fingerprint data of sufficient quality. Generally, a short period of capturing fingerprint data results in poor-quality fingerprint data. Conversely, high-quality fingerprint data generally requires a longer period of capturing fingerprint data sets.

SUMMARY

An object of the present invention is to solve, or at least mitigate, this problem in the art and thus to provide an improved method of capturing fingerprint data of a user.

This object is attained in a first aspect of the invention by a method of a fingerprint sensing system arranged in an electronic device of capturing fingerprint data of a user contacting a fingerprint sensor of the fingerprint sensing system. The method comprises capturing initial fingerprint data of the user, controlling the electronic device to notify the user that an action associated with the captured initial fingerprint data is performed, and capturing further fingerprint data after the initial fingerprint data associated with the performed action has been captured but before the fingerprint sensor no longer detects a finger contacting the fingerprint sensor.

This object is attained in a second aspect of the invention by a fingerprint sensing system arranged in an electronic device, the system comprising a fingerprint sensor configured to capture fingerprint data of a user contacting the fingerprint sensor. The fingerprint sensor is configured to capture initial fingerprint data of the user, and a processing unit of the fingerprint sensing system is configured to control the electronic device to notify the user that an action associated with the captured initial fingerprint data is performed. The fingerprint sensor is further configured to capture further fingerprint data after the initial fingerprint data associated with the performed action has been captured but before the fingerprint sensor no longer detects a finger contacting the fingerprint sensor.

Hence, after the fingerprint sensor has captured initial fingerprint data of the user, the initial fingerprint data being used for instance for authenticating the user in order to unlock a smart phone in which the fingerprint sensing system is arranged by matching the captured initial fingerprint data to a previously enrolled fingerprint template, the sensor will continue to capture further fingerprint data, possibly up until a moment where the sensor no longer detects a finger contacting the fingerprint sensor.

Hence, even though the initially captured fingerprint results in an appropriate action of which the user is notified, such as the smart phone being unlocked after successful authentication of the user, the sensor will continue to capture further fingerprint data.

Since the user will not instantly remove her finger from the sensor, but will remain in contact with the sensor for a shorter (or longer) time period after the initial fingerprint data has been captured and the phone has been unlocked, the fingerprint system of the invention will advantageously use that time period to capture further fingerprint data of the user.

Advantageously, the method of the invention provides for a short period of registering the users' fingerprint for the purpose of performing an action based on the registered fingerprint, and also facilitates capturing further fingerprint data which is required for ultimately obtaining a high-quality representation of a fingerprint of the user from the further captured fingerprint data.

After the further fingerprint data has been captured, which typically is of a higher quality than the initially captured fingerprint data resulting in the user being notified of an action taken by the fingerprint sensing system, a number of measures to be taken can be envisaged.

In an embodiment, the captured further fingerprint data is compared to the captured initial fingerprint data in order to ensure that the authentication based on the initial fingerprint data indeed was correct.

In an alternative embodiment, the captured further fingerprint data is compared to the enrolled fingerprint template in order to ensure that the authentication based on the initial fingerprint data indeed was correct.

If the matching is unsuccessful, the user will in an embodiment be requested to state her security credentials, for instance by entering her pin code via a display of the smart phone.

In a further embodiment a quality of the captured initial fingerprint data is determined, and if the determined quality exceeds a predetermined enrolment threshold value, the captured initial fingerprint data is enrolled as a new fingerprint data template.

In still another embodiment, a quality of the captured further fingerprint data is determined, and if the determined quality exceeds a predetermined quality threshold value, the enrolled fingerprint data template is updated based on the captured further fingerprint data.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
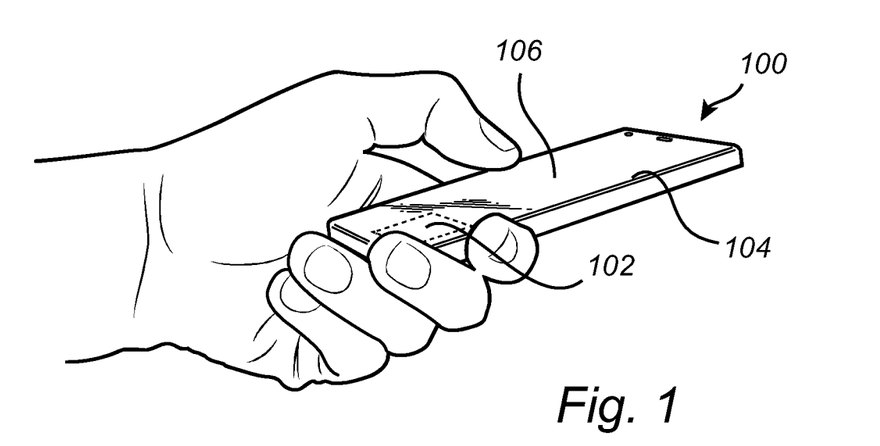
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
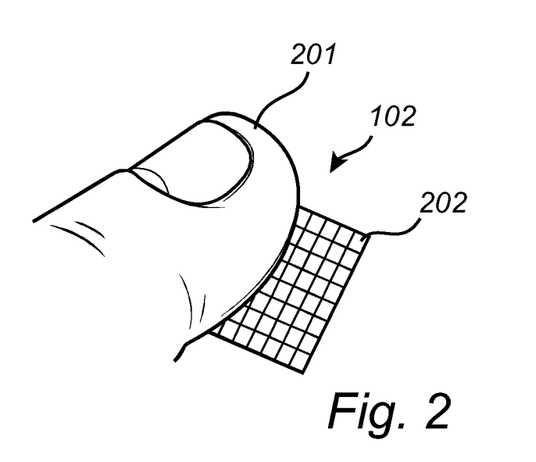
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
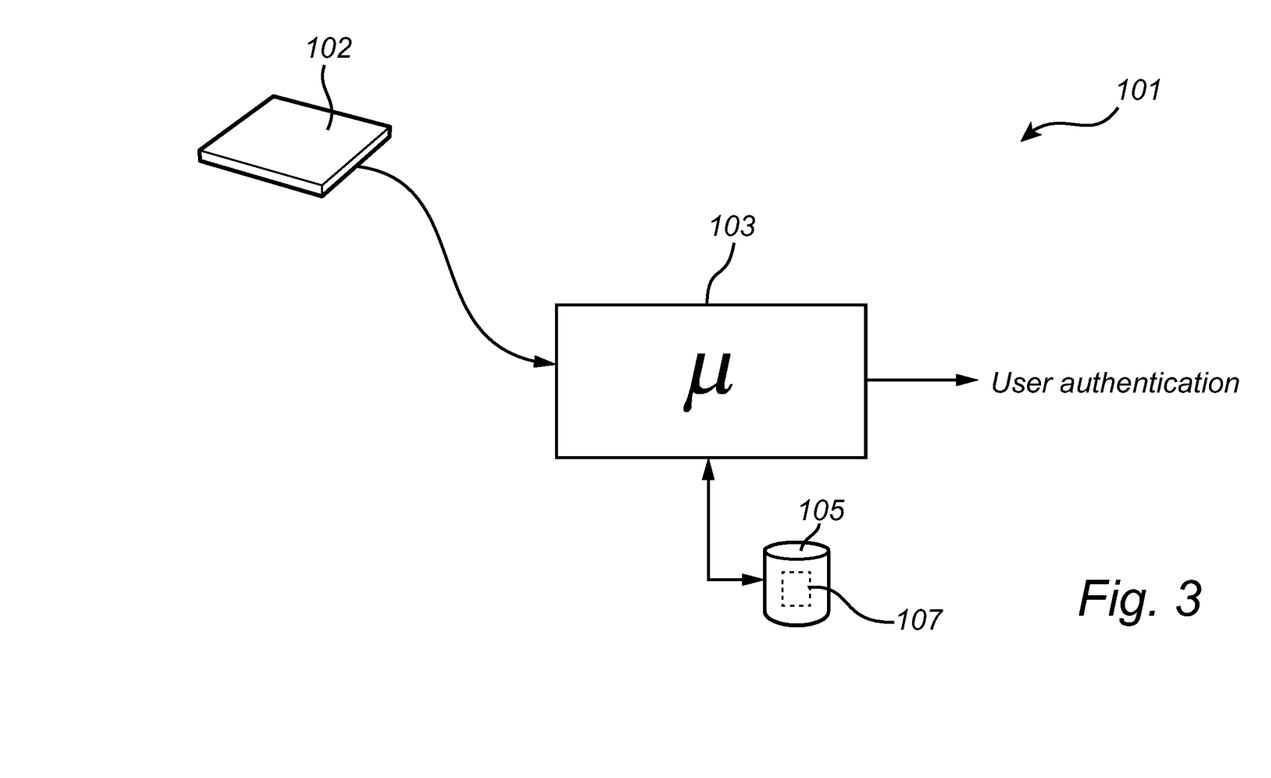
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Now, when the user places her finger on the fingerprint sensor 102, either for initially enrolling the fingerprint template of the user in the fingerprint sensing system 101 or subsequently when comparing a captured fingerprint of the user with the enrolled template for authentication purposes, the user is notified when the fingerprint sensing system 101 has enrolled and/or authenticated the user. Preferably, the period of time elapsing from the moment when the user places her finger on the sensor 102 up until the moment when the fingerprint sensing system 101 has completed enrolment and/or authentication and thus notifies the user accordingly should be as short as possible to avoid that the enrolment/authentication process is perceived as slow and tedious by the user.

However, from a general point of view, the shorter the enrolment/authentication period, the poorer the quality of the captured fingerprint data; during the time period from the moment of the sensor 102 detecting a finger contact until the user is notified that the enrolment/authentication is completed and the user thus removes her finger from the sensor 102, the sensor may have captured fingerprint data of a quality sufficient enough to complete the enrolment/authentication process but which is still far from being considered a top-quality representation of the fingerprint of the user.

Figure 4:
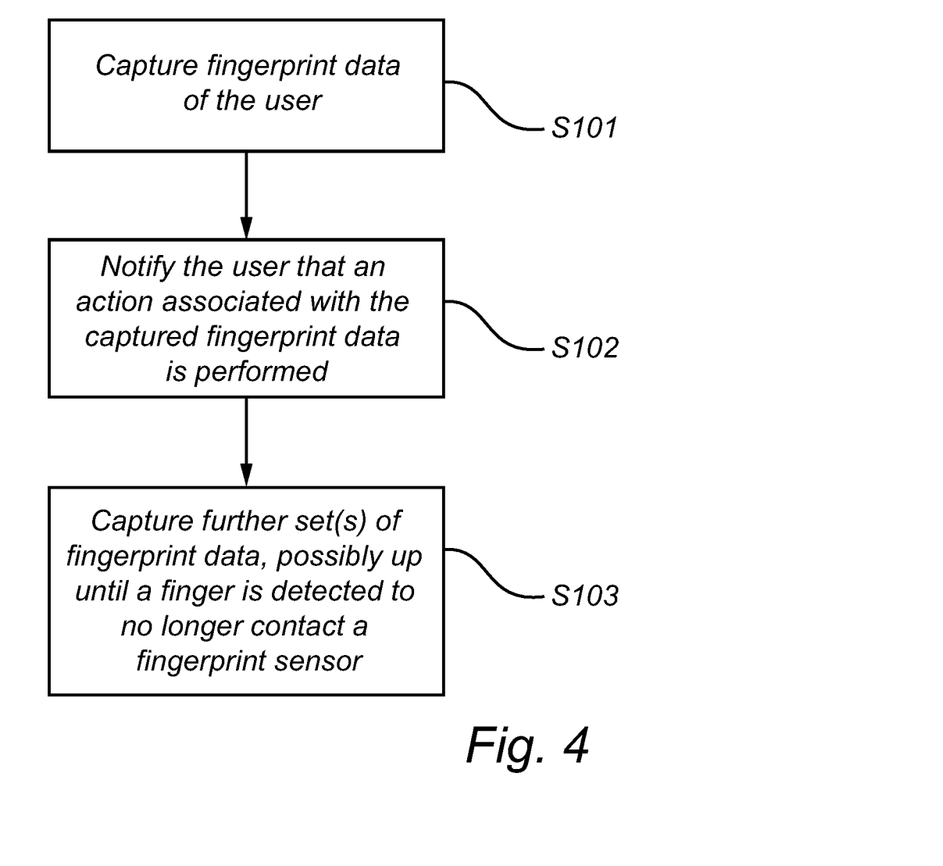
FIG. 4 illustrates a flowchart of the method of capturing fingerprint data of a user according to an embodiment of the present invention.

FIG. 4 illustrates a flowchart of a method according to the invention of capturing fingerprint data of a user.

Hence, in a first step S101, the user places her finger on a surface of a sensing area of the fingerprint sensor 102, for instance by placing her thumb on a home button of the smart phone 100, under which the sensor 102 is arranged, whereupon the sensor 102 captures initial fingerprint data of the user. It is noted that a number of sets of fingerprint data may be captured by the sensor.

In this exemplifying embodiment, it is assumed that the user desires to perform an authentication process for having her smart phone 100 transition from a locked to an unlocked state.

After the sensor 102 has captured one or more sets of initial fingerprint data of the user, the user is notified in step S102 that an action associated with the captured initial fingerprint data is completed, in this particular example the notification comes in the form of unlocking the mobile phone 100 and displaying the home screen of the phone to the user.

Now, the user will not instantly remove her finger from the sensor but will remain in contact with the sensor 102 for a shorter (or longer) time period after the phone 100 has been unlocked; even if the user would remove her finger, there will still be a period of time when further fingerprint data can be captured.

Thus, after the initial fingerprint data has been captured that resulted in the issued notification in the form of the phone 100 being unlocked, the sensor 102 will continue to capture fingerprint data in step S103, possibly up until the moment where the fingerprint sensor 102 no longer detects a finger contacting the fingerprint sensor.

Advantageously, the method of the invention provides for a short period of registering the users' fingerprint for the purpose of performing an action based on the registered fingerprint, and also facilitates capturing further fingerprint data which is required for ultimately obtaining a high-quality representation of a fingerprint of the user from the further captured fingerprint data.

After the further fingerprint data has been captured, which oftentimes is of a higher quality than the initially captured fingerprint data resulting in the user being notified of an action taken by the fingerprint sensing system 100, a number of measures to be taken can be envisaged.

Figure 5:
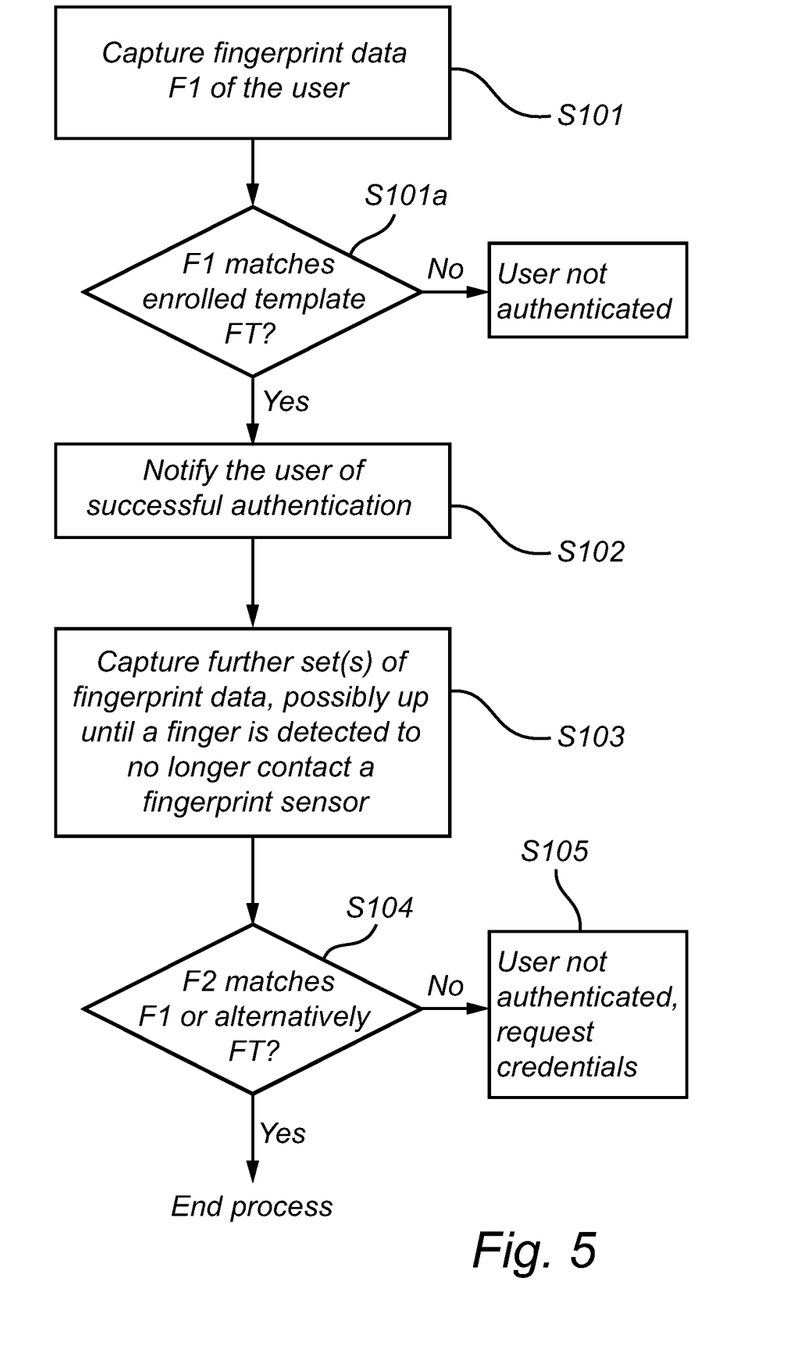
FIG. 5 illustrates a flowchart of the method of capturing fingerprint data of a user according to a further embodiment of the present invention.

In a first exemplifying embodiment, with reference to FIG. 5, first, initial fingerprint data F1 is captured by the sensor 102. In step S101a, the processing unit 103 compares the first fingerprint data F1 to a previously enrolled fingerprint template FT, and if there is a match, the user is authenticated and the smart phone 101 is controlled ty the processing unit 103 to transit to its unlocked state. If not, the user is not authenticated, and is typically requested to enter her pin code via the display of the phone 100.

It is noted that the process in practice may require further steps well known to a skilled person, such as for instance one or more feature extraction steps where details pertaining to ridges of the captured fingerprint of the user, e.g. ridge endings, bifurcations, and short ridges, are extracted and processed in order to represent the user's fingerprint.

Now, after the first fingerprint data F1—which resulted in the authentication of the user—has been captured by the sensor 102, the sensor continues to capture one or more further sets of fingerprint data in step S103, in the following referred to as second fingerprint data F2. It is noted that the capturing of the further fingerprint data F2 typically commences directly after the capturing of the first fingerprint data, and is thus typically performed in parallel with the matching and notifying steps S101a and S102.

Advantageously, in order to have the fingerprint sensing system 101 provide a high level of security level, the processing unit 103 proceeds to Step S104 where it is verified that the second, higher-quality fingerprint data F2 and the first fingerprint data F.

If the first fingerprint data F1 that was utilized to unlock the phone 100 differs from the subsequently captured second fingerprint F2 to such an extent that it is questionable whether the first fingerprint F1 is equal to the second "better" fingerprint F2, the user is not authenticated, the fingerprint sensing system 101 takes an appropriate security measure, such as e.g. instantly locking the phone 100 and requesting the user to enter her security credentials in step 105, for instance her pin code, in order to unlock the smart phone 100.

Alternatively in step S104, the second fingerprint F2 is compared to enrolled template FT, and if there is no match the user is not authenticated, wherein the fingerprint sensing system 101 takes an appropriate security measure and requests the user to enter her security credentials in step 105.

Figure 6A:
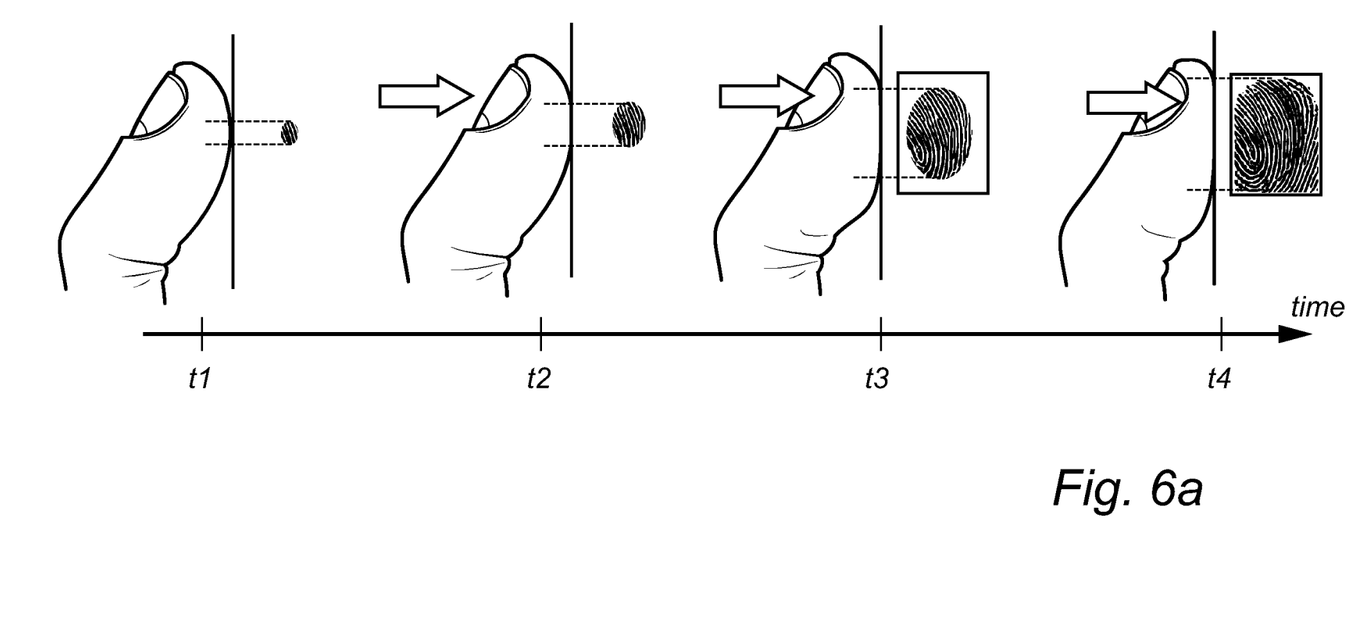
FIG. 6a illustrates a sequence of fingerprint data captured at four different instances in time.

FIG. 6a illustrates a sequence of fingerprint data captured at four different instances in time. At a first instant of time t1, the fingerprint sensor 102 captures fingerprint data where the finger of the user has not been fully pressed against a surface of a sensing area of the fingerprint sensor 102.

At a second instant of time t2, the fingerprint sensor 102 captures fingerprint data where the finger of the user is slightly harder pressed against the surface of the sensing area of the fingerprint sensor 102, while a third instant of time t3, the finger of the user is further pressed against the surface of the sensing area of the fingerprint sensor 102.

At the fourth instant of time t4, the finger of the user is fully pressed against the surface of the sensing area of the fingerprint sensor 102, and high-quality fingerprint data is thus captured.

Figure 6B:
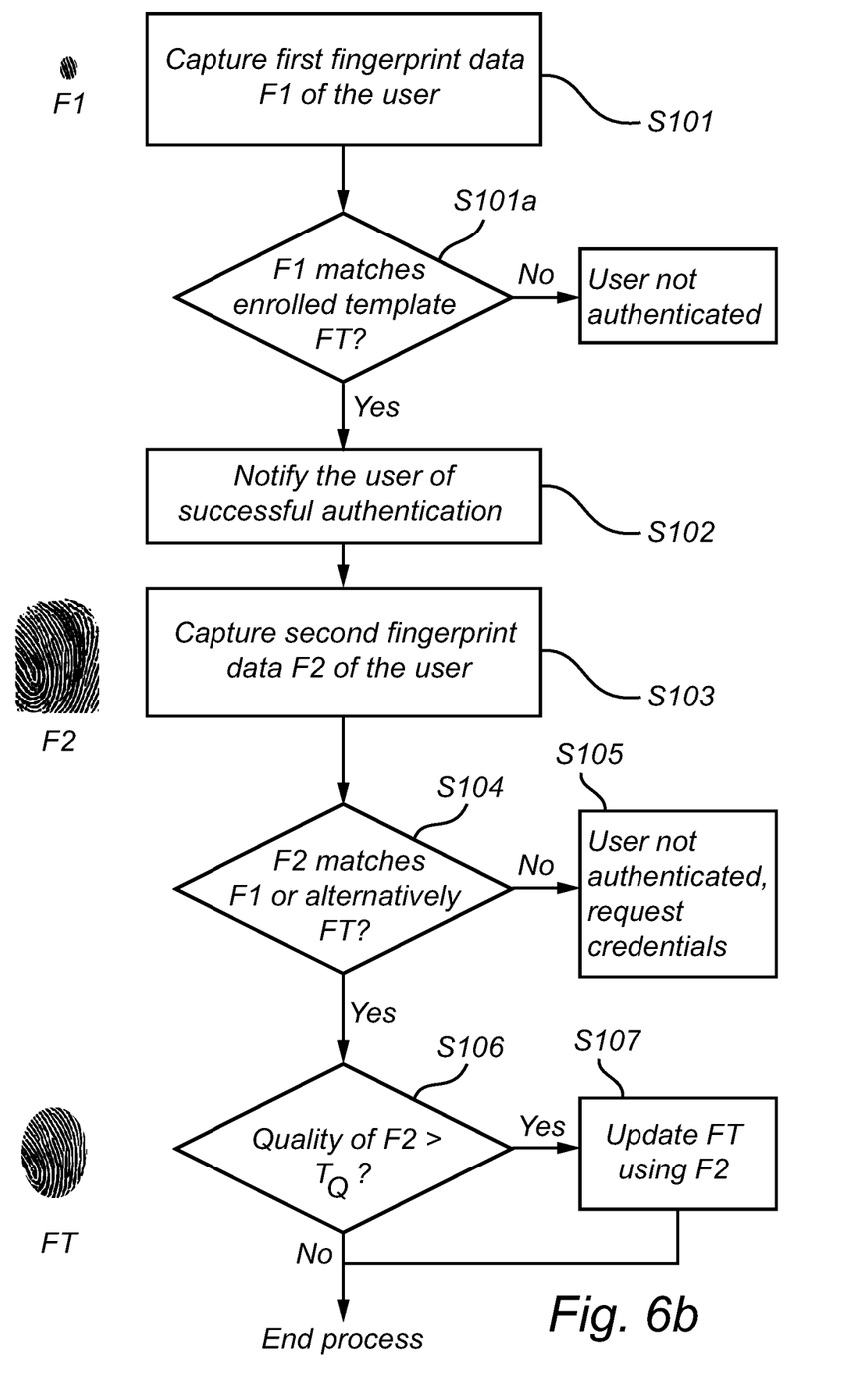
FIG. 6b illustrates a flowchart of the method of capturing fingerprint data of a user according to still a further embodiment of the present invention.

In a second exemplifying embodiment, with reference to FIG. 6b, the fingerprint sensing system 101 will utilize captured second fingerprint data F2 to improve the enrolled template FT.

As in the embodiment of FIG. 5, first fingerprint data F1 (illustrated on a left-hand side of the flowchart) is captured by the sensor 102 in step S101. In step S101a, the processing unit 103 compares the first fingerprint data F1 to a previously enrolled fingerprint template FT, and if there is a match, the user is authenticated and the smart phone 101 is controlled ty the processing unit 103 to transit to its unlocked state. If not, the user is not authenticated, and is typically requested to enter her pin code via the display of the phone 100.

The sensor 102 also captures second fingerprint data F2 in step S103, and in step S104 the processing unit 103 verifies in step S104 that the second, higher-quality fingerprint data F2 matches the first fingerprint data F1.

Alternatively in step S104, the second fingerprint F2 is compared to the enrolled template FT, and if there is no match the user is not authenticated, wherein the fingerprint sensing system 101 takes an appropriate security measure and requests the user to enter her security credentials in step 105.

In this particular embodiment, the second fingerprint data F2 is indeed considered to match the first fingerprint data F1, and the processing unit 103 proceeds to step S106, in which the quality of the second fingerprint data F2 is assessed. In this example, the processing unit 103 determines whether the quality of the second fingerprint data exceeds a predetermined quality threshold $T_Q$. If that is the case, the second fingerprint F2 is considered to be of a higher quality than the enrolled template FT, and will be used in step S107 to either improve the enrolled template, or possibly even replace the enrolled template FT. As is illustrated on a left-hand side of the flowchart, the second fingerprint data F2 is of a higher quality than the enrolled template FT As an example, the quality of the second fingerprint f2 may be assessed by determining a sensor coverage area of the fingerprint, where a greater coverage area typically is better than a smaller area, or a matching value may be associated with the second fingerprint data F2, where a better matching as compared to the first fingerprint data F1 is given a higher matching value and the second fingerprint data F2 is thus considered to be of a higher quality.

Figure 7:
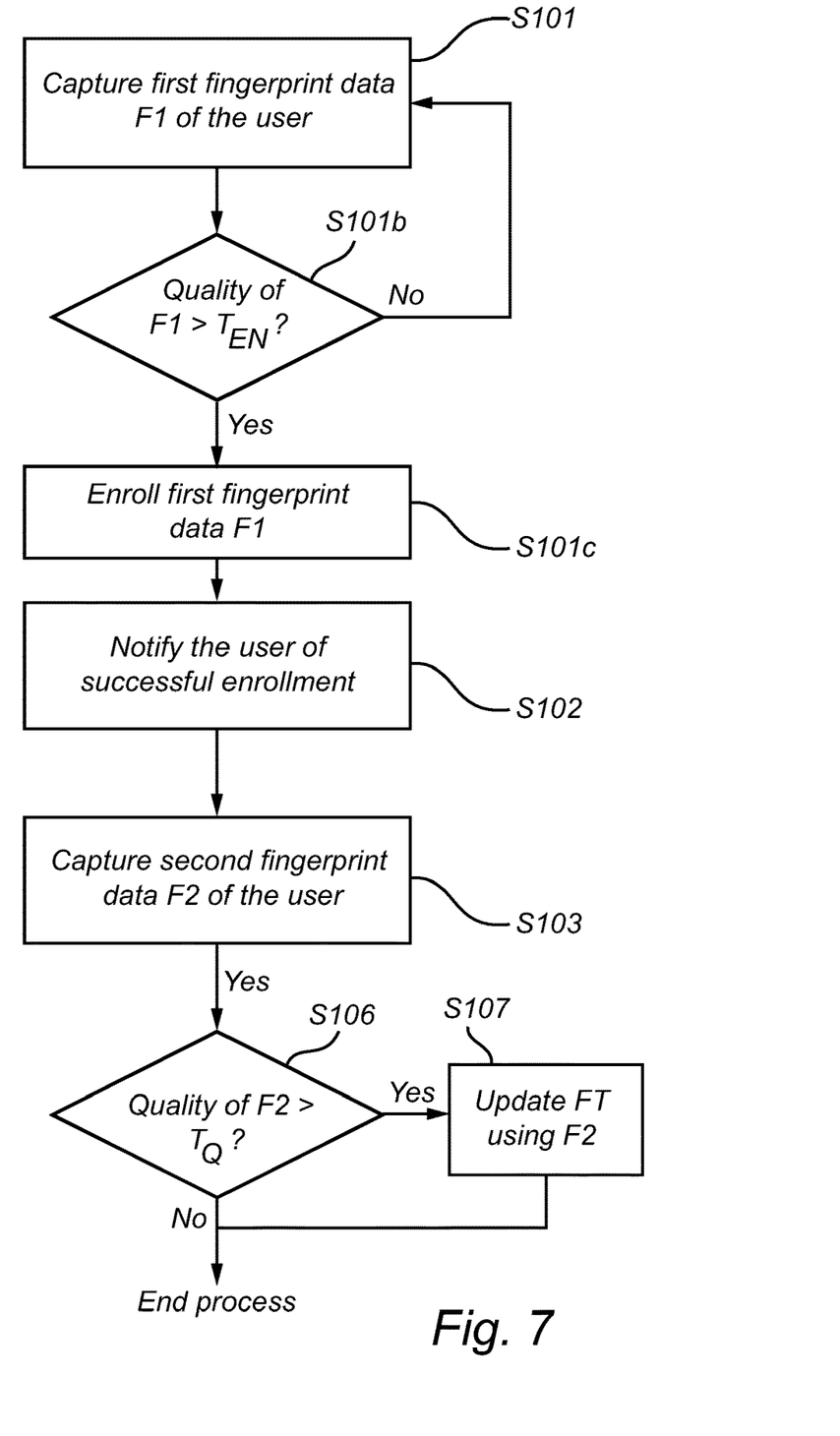
FIG. 7 illustrates a flowchart of the method of capturing fingerprint data of a user according to yet a further embodiment of the present invention.

In a third exemplifying embodiment, with reference to FIG. 7, an enrolment process will be described. Again, in a first step S101, the user places her finger on a surface of a sensing area of the fingerprint sensor 102, whereupon the sensor 102 captures first, initial fingerprint data F1 of the user. It is noted that a number of sets of fingerprint data may be captured by the sensor.

In this exemplifying embodiment, it is assumed that the user is to be enrolled by the fingerprint sensing system 101 arranged in the smart phone 100. Hence, fingerprint data to be subsequently used by the fingerprint sensing system 101 as a template for authenticating the user is registered at the phone 100.

In step S101b, the processing unit 103 checks whether the quality of the captured first fingerprint data F1 is of sufficient quality to be enrolled in the system. For instance, this may be performed by determining the quality of the first fingerprint data F1 and comparing the quality to a predetermined enrolment threshold value $T_{EN}$, and it the quality of F1 exceeds the enrolment threshold value $T_{EN}$, the captured initial fingerprint data F1 is considered good enough to be enrolled with the system in step S101c. If not, further first fingerprint data is captured until fingerprint data can be enrolled.

After the sensor 102 has captured and enrolled the first fingerprint data F1 in the system, the user is notified in step S102 that an action associated with the captured initial fingerprint data is completed, in this particular example by informing the user via the display of the phone 100 (and/or possibly even audibly) that the enrolment is complete.

However, as previously has been discussed, further, second fingerprint data is captured by the sensor 102 in step S103, possibly up until the moment where the sensor 102 no longer detects contact with the user's finger.

The processing unit 103 then proceeds to step S106, in which the quality of the second fingerprint data F2 is assessed. In this example, the processing unit 103 determines whether the quality of the second fingerprint data exceeds a predetermined quality threshold $T_Q$. If that is the case, the second fingerprint F2 is considered to be of a higher quality than the enrolled template FT, and will be used in step S107 to either improve the enrolled template, or possibly even replace the enrolled template FT.

Figure 8A:
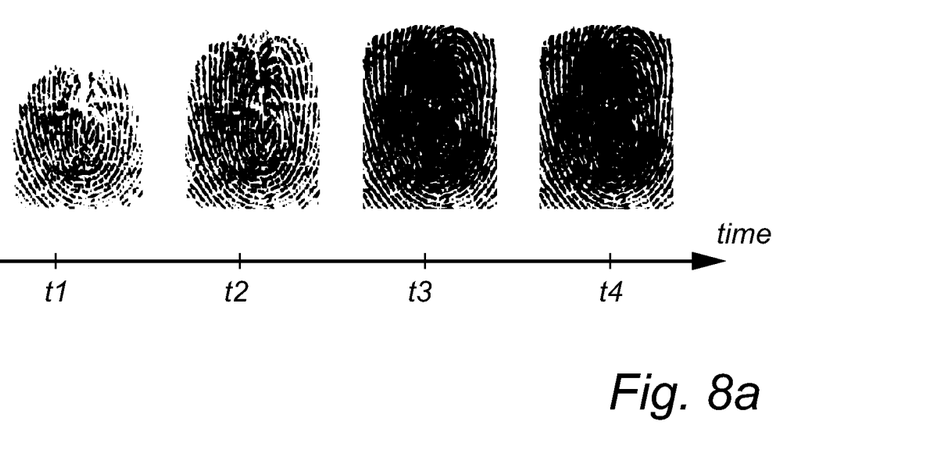
FIG. 8a illustrates another sequence of fingerprint data captured at four different instances in time.

FIG. 8a illustrates a further sequence of fingerprint data captured at four different instances in time. At a first instant of time t1, the fingerprint sensor 102 captures fingerprint data where the finger of the user has not been fully pressed against a surface of a sensing area of the fingerprint sensor 102.

At a second instant of time t2, the fingerprint sensor 102 captures fingerprint data where the finger of the user is slightly harder pressed against the surface of the sensing area of the fingerprint sensor 102, while a third instant of time t3, the finger of the user is further pressed against the surface of the sensing area of the fingerprint sensor 102.

At the fourth instant of time t4, the finger of the user is fully pressed against the surface of the sensing area of the fingerprint sensor 102, and high-quality fingerprint data is thus captured.

The appearance of the images captured in the sequence may be the result of sweat or moist on the user's finger, or alternatively the result of a malicious third party attempting to spoof the smart phone 100 with fake fingerprints.

Figure 8B:
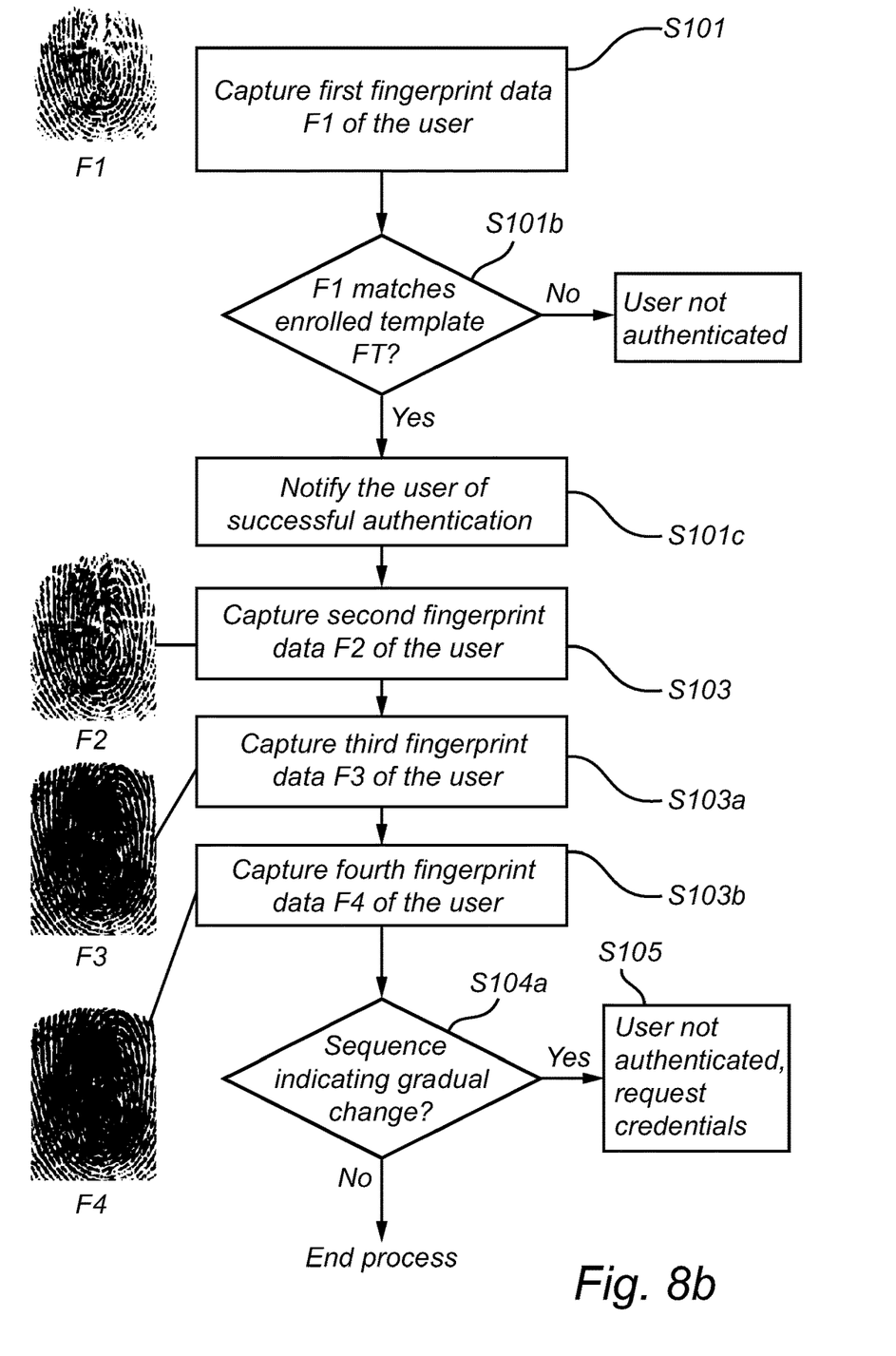
FIG. 8b illustrates a flowchart of the method of capturing fingerprint data of a user according to yet a further embodiment of the present invention.

In a further exemplifying embodiment, with reference to FIG. 8b, a sequence of images is captured and analysed, e.g. for determining if the mobile phone 100 is suspected to be subjected to a spoofing attempt.

First fingerprint data F1 is captured by the sensor 102. In step S101a, the processing unit 103 compares the first fingerprint data F1 to a previously enrolled fingerprint template FT, and if there is a match, the user is authenticated and the smart phone 101 is controlled ty the processing unit 103 to transit to its unlocked state. If not, the user is not authenticated, and is typically requested to enter her pin code via the display of the phone 100.

Now, after the first fingerprint data F1—which resulted in the authentication of the user—has been captured by the sensor 102, the sensor continues to capture second fingerprint data F2 in step S103. Again, it should be noted that the capturing of the further fingerprint data F2 typically commences directly after the capturing of the first fingerprint data, and is thus typically performed in parallel with the matching and notifying steps S101a and S102.

Further, third fingerprint data $F_3$ is captured in step S103a and fourth fingerprint data F4 is captured in step S103b. The captured sets of fingerprint data F1-F4 are illustrated on the left-hand side of the flowchart.

Advantageously, in order to have the fingerprint sensing system 101 provide a high level of security level, the processing unit 103 proceeds to Step S104 where it is verified that the second, higher-quality fingerprint data F2 and the first fingerprint data F.

In this embodiment, the sequence of captured fingerprint data F1-F4 are analysed in step S104a, and if the sets of captured fingerprint data F1-F4 indicates a (sufficient) gradual change in the captured fingerprint print data, the processing unit 103 controls the smart phone 100 to perform a safety measure, such as for instance requesting the user to enter her PIN code in step S105.

Alternatively, the processing unit 103 may analyse the sequence for finding artefacts indicating spoof. For instance, the second fingerprint data F2 presents a higher degree of sensing area coverage than the first fingerprint data F2. Known algorithms of spoof detection may be employed to find any artefacts. If a spoofing attempt has occurred, the method proceeds to step S105 where the user typically is requested to enter her PIN code.

To determine the gradual change, the processing unit 103 may compare each set of captured fingerprint data with the immediately preceding captured set, and compute one or more change metrics for each comparison. If a value of a change metric exceeds a predetermined change threshold value, the change is considered to be sufficiently substantial to motivate a safety measure being taken in step S105. Further, a value of a change metric may be determined to lie within a predetermined range delimited by a lower threshold value and an upper threshold in order for the object touching the sensor be considered to constitute a live finger. The predetermined range would typically be defined as a range which would comply with live fingers.

Change metric examples are for instance measures of sweat and degree of deformation of a captured fingerprint.

Hence, F2 is compared to F1, F3 is compared to F2, and so on, and if one or more of the comparisons result in a change metric value exceeding the threshold value, the processing unit 103 makes the assessment that a spoofing attempt may have been undertaken, and an appropriate safety measure in taken in step 105. The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a fingerprint sensing system arranged in an electronic device of capturing fingerprint data of a user contacting a fingerprint sensor of the fingerprint sensing system, comprising:
    capturing initial fingerprint data of the user during a user touch event;
    controlling the electronic device to notify the user that the user has been successfully authenticated or enrolled using the captured initial fingerprint data; and
    capturing further fingerprint data after the initial fingerprint data used for the successful authentication or enrolment has been captured but before the fingerprint sensor no longer detects a finger contacting the fingerprint sensor during the same user touch event.

2. The method of claim 1, further comprising:
    comparing the captured initial fingerprint data to an enrolled fingerprint data template, and when there is a match the user is authenticated.

3. The method of claim 1, further comprising:
    comparing the captured further fingerprint data to the captured initial fingerprint data, and when there is a match the user is authenticated.

4. The method of claim 3, further comprising:
    requesting the user to enter her security credentials via the electronic device when the captured further fingerprint data does not match the captured initial fingerprint data, or when the captured further fingerprint data does not match the enrolled fingerprint data template.

5. The method of claim 1, further comprising:
    comparing the captured further fingerprint data to an enrolled fingerprint data template, and when there is a match the user is authenticated.

6. The method of claim 1, further comprising:
    determining a quality of the captured initial fingerprint data; and when the determined quality exceeds a predetermined enrolment threshold value;
    enrolling the captured initial fingerprint data as a fingerprint data template.

7. The method of claim 1, further comprising:
    determining a quality of the captured further fingerprint data; and when the determined quality exceeds a predetermined quality threshold value;
    updating an enrolled fingerprint data template based on the captured further fingerprint data.

8. The method of claim 1, wherein the capturing of further fingerprint data comprises:
    capturing a sequence of fingerprint data sets; and
    determining, for said sequence, when a change in the captured fingerprint print data has occurred, and when the change has occurred
    controlling the electronic device to perform a safety measure.

9. The method of claim 8, wherein the determining when a change in the fingerprint data has occurred for captured sequence further comprises:
    determining when for at least two of the captured fingerprint data sets in the sequence a change has occurred exceeding a predetermined change threshold value, or being outside a predetermined allowed change range, in which case the electronic device is controlled to perform a safety measure.

10. A computer program product comprising a non-transitory computer readable medium, the non-transitory computer readable medium having a computer program comprising computer-executable instructions embodied thereon for causing the fingerprint sensing system to perform steps recited in claim 1 when the computer-executable instructions are executed on at least one processor included in the fingerprint sensing system.

11. A fingerprint sensing system arranged in an electronic device, the system comprising a fingerprint sensor configured to capture fingerprint data of a user contacting the fingerprint sensor, the fingerprint sensor being configured to:
capture initial fingerprint data of the user during a user touch event; the fingerprint sensing system further comprising:
at least one processor being configured to:
control the electronic device to notify the user that the user has been successfully authenticated or enrolled using the captured initial fingerprint data;
the fingerprint sensor further being configured to:
capture further fingerprint data after the initial fingerprint data used for the successful authentication or enrolment has been captured but before the fingerprint sensor no longer detects a finger contacting the fingerprint sensor during the same user touch event.

12. The fingerprint sensing system of claim 11, the at least one processor further being configured to:
compare the captured initial fingerprint data to an enrolled fingerprint data template, and when there is a match the user is authenticated.

13. The fingerprint sensing system of claim 11, the at least one processor further being configured to:
compare the captured further fingerprint data to the captured initial fingerprint data, and when there is a match the user is authenticated.

14. The fingerprint sensing system of claim 13, the at least one processor further being configured to:
request the user to enter her security credentials via the electronic device when the captured further fingerprint data does not match the captured initial fingerprint data, or when the captured further fingerprint data does not match the enrolled fingerprint data template.

15. The fingerprint sensing system of claim 11, the at least one processor further being configured to:
compare the captured further fingerprint data to an enrolled fingerprint data template, and when there is a match the user is authenticated.

16. The fingerprint sensing system of claim 11, the at least one processor further being configured Lo:
determine a quality of the captured initial fingerprint data; and when the determined quality exceeds a predetermined enrolment threshold value;
enroll the captured initial fingerprint data as a fingerprint data template.

17. The fingerprint sensing system of claim 11, the at least one processor further being configured to:
determine a quality of the captured further fingerprint data; and when the determined quality exceeds a predetermined quality threshold value;
update an enrolled fingerprint data template based on the captured further fingerprint data.

18. The fingerprint sensing system of claim 11, the at least one processor further being configured to, when capturing the further fingerprint data:
capture a sequence of fingerprint data sets; and
determine, for said sequence, when a change in the captured fingerprint print data has occurred, and when the change has occurred
control the electronic device to perform a safety measure.

19. An electronic device comprising the fingerprint sensing system of claim 11.

* * * * *